F. SMITH.
ATTACHMENT FOR SHOCK ABSORBERS.
APPLICATION FILED JULY 27, 1910.

1,066,763.

Patented July 8, 1913.

WITNESSES:

INVENTOR
Ford Smith
BY
ATTORNEYS

UNITED STATES PATENT OFFICE.

FRED SMITH, OF STAMFORD, CONNECTICUT, ASSIGNOR, BY MESNE ASSIGNMENTS, TO THE ARISTOS COMPANY, A CORPORATION OF DELAWARE.

ATTACHMENT FOR SHOCK-ABSORBERS.

1,066,763.  Specification of Letters Patent.  Patented July 8, 1913.

Application filed July 27, 1910. Serial No. 574,108.

*To all whom it may concern:*

Be it known that I, FRED SMITH, a citizen of the United States, residing at Stamford, in the county of Fairfield and State of Connecticut, have invented certain new and useful Improvements in Attachments for Shock-Absorbers, of which the following is a full, clear, and exact description, such as will enable others skilled in the art to which it appertains to make and use the same.

This invention relates to the mounting of vehicle bodies.

One of the objects thereof is to provide a simple and practical, adjustable means for attaching shock absorbers to vehicles.

Another object is to provide a universal attachment for shock absorbers of the type employed in connection with springs of vehicles and comprising members which are normally disposed in a predetermined relation to one another.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claim.

Figure 1:
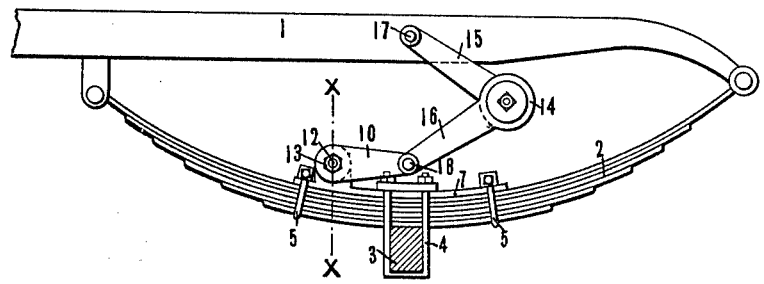
Figure 2:
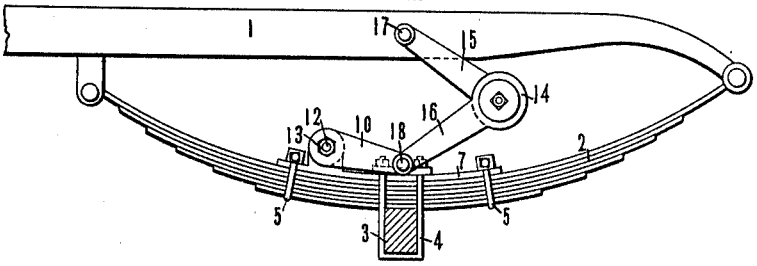
Figure 3:
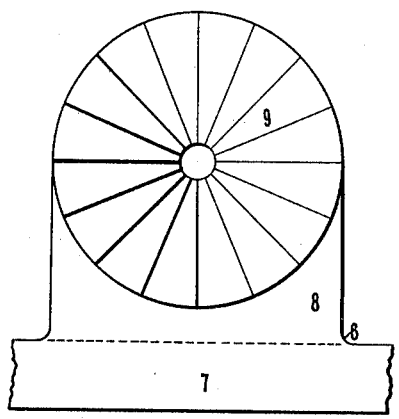
Figures 4, 5:
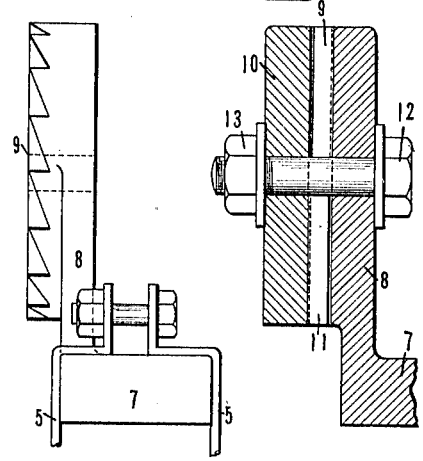

In the accompanying drawings wherein is shown one of various possible embodiments of this invention, Figure 1 is a side elevation of the device showing the relative position of the various parts under certain conditions of use. Fig. 2 is a similar view showing the disposition of the parts under different conditions. Fig. 3 is a partial side elevation of a member of the attaching means. Fig. 4 is an end view of the same. Fig. 5 is a partial cross section taken on line *x—x* of Fig. 1.

Similar reference characters refer to similar parts throughout the several views of the drawings.

In order that certain features of this invention may be more readily understood, it may be noted that after vehicle springs have been used for a while they receive a permanent set which lowers the position of the vehicle body relative thereto, in some cases, several inches. It should also be noted that shock absorbers of the type here in disclosed comprise a pair of pivoted members which are designed to have a predetermined relation to one another under the normal load of the vehicle. If, therefore, it be attempted to connect these members directly to the vehicle body and spring when the latter is new it will be found that with the settling of the spring the pivoted members approach more closely to one another and the predetermined relationship under normal conditions ceases to exist. As a result the effectiveness of the shock absorber is greatly diminished or even entirely destroyed.

The present invention aims, among other things, to overcome this difficulty and to provide a practical fastening means adapting the shock absorber for use upon any vehicle irrespective of the distance between its points of connection thereto.

Referring now to the accompanying drawings, there is shown in Figs. 1 and 2 a spring bar or portion of the vehicle frame 1, and connected thereto a spring 2, herein shown as of the semi-elliptical type, which is mounted upon the axle 3 and secured thereto by means of the clip or hanger 4. Clamped upon the spring as by means of the hanger 4 and clips 5 is a drop forging 6 comprising a flat leaf portion 7 and a rectangularly offset portion 8. The offset 8 is positioned near one end of the leaf portion and is provided with an outwardly projecting face comprising a plurality of radially disposed teeth 9. A second drop forging 10 provided with a similarly toothed face 11 is secured to the member 6 by means of a bolt 12 which passes through holes provided for that purpose centrally of the said faces. The teeth of the respective members interfit with one another and prevent relative movement of the parts when forced together by means of the nut 13. A shock absorber 14 comprising a pair of pivotally connected members 15 and 16 is secured to the frame 1 and the arm 10 as by means of the pivots 17 and 18 and is designed to have its said members normally disposed in a predetermined relation to one another.

In Fig. 1 the device is shown upon a vehicle frame in operative position relative to a new spring, while in Fig. 2 the parts are shown as adjusted to render effective a shock absorber used in connection with an old spring which has acquired a permanent set. The adjustment for various conditions of usage is readily made by loosening the bolt 12 and turning the arm far enough about its axis to bring the members 15 and 16 to their proper, predetermined relative position, and when the bolt is set up the members are held immovable by the contacting surfaces of their respective teeth.

It is to be noted that with vehicle constructions in which the spring is not in vertical alinement with the frame, the plate or member 6 may have its position reversed so as to bring the offset portion 8 upon the inside of the spring, to provide for the correct disposal of the shock absorber. It is also within the scope of this invention to provide the members 6 of either left or right hand construction.

From the foregoing it will be seen that this invention is one well adapted to accomplish all of the ends and objects hereinbefore set forth in a simple and practical manner and that the parts are readily interchangeable and may be cheaply manufactured.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claim is intended to cover all of the generic and specific features of the invention herein described and all statements of the scope of the invention, which, as a matter of language, might be said to fall therebetween.

Having described my invention, what I claim as new and desire to secure by Letters Patent is:

In a device of the character described, in combination, with a vehicle having a frame and a spring, a shock absorber comprising two arms yieldingly held at a normal angular relation, one of said arms being pivotally connected to said frame, a relatively fixed part secured to said spring between its end and point of attachment to the axle, and an arm having offset projections adjustably mounted on said part pivotally connected with the second arm of said shock absorber, whereby said shock absorber while maintaining its normal effective position may be easily adjusted to the varying conditions of the vehicle while maintaining said pivotal connections in substantially vertical alinement.

In testimony whereof I affix my signature, in the presence of two witnesses.

FRED SMITH.

Witnesses:
Wm. N. White,
William S. Hirschberg.

---

Copies of this patent may be obtained for five cents each, by addressing the "Commissioner of Patents, Washington, D. C."